United States Patent
Sirol

(10) Patent No.: US 8,426,540 B2
(45) Date of Patent: Apr. 23, 2013

(54) TRIDENTATE LIGAND COMPOUNDS WITH IMINO FURAN UNITS, METHOD FOR MANUFACTURING SAID COMPOUNDS, AND THEIR USE IN THE PREPARATION OF CATALYSTS FOR THE HOMOPOLYMERISATION AND COPOLYMERISATION OF ETHYLENE AND ALPHA-OLEFINS

(75) Inventor: Sabine Sirol, Horrues (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 460 days.

(21) Appl. No.: 12/664,461

(22) PCT Filed: May 30, 2008

(86) PCT No.: PCT/EP2008/056692
§ 371 (c)(1),
(2), (4) Date: Aug. 23, 2010

(87) PCT Pub. No.: WO2009/015922
PCT Pub. Date: Feb. 5, 2009

(65) Prior Publication Data
US 2010/0311930 A1   Dec. 9, 2010

(30) Foreign Application Priority Data

Jun. 14, 2007   (EP) ..................................... 07110304

(51) Int. Cl.
C08F 4/76 (2006.01)
C08F 4/64 (2006.01)
C08F 4/52 (2006.01)

(52) U.S. Cl.
USPC ........... 526/172; 526/161; 526/170; 526/160; 526/348; 526/348.5; 526/351; 526/352; 556/51; 556/57; 556/42; 556/45

(58) Field of Classification Search .................... 556/51; 526/172, 161
See application file for complete search history.

(56) References Cited

U.S. PATENT DOCUMENTS

| | | | |
|---|---|---|---|
| 5,714,556 A | 2/1998 | Johnson | |
| 6,531,424 B2 * | 3/2003 | Ittel et al. ...................... | 502/155 |
| 7,268,095 B2 * | 9/2007 | Preishuber-Pflugl et al. | 502/117 |
| 2002/0107345 A1 | 8/2002 | Ittel | |

FOREIGN PATENT DOCUMENTS

| | | |
|---|---|---|
| EP | 1238989 | 9/2002 |
| EP | 1 925 623 A1 * | 5/2008 |
| WO | WO2004/041796 | 5/2004 |

OTHER PUBLICATIONS

Matsui S Et Al: "FI Catalysts: super active new ethylene polymerization catalysts" Catalysis Today, Elsevier, vol. 66, No. 1, 2001, p. 63-73.

Belal, A.A.M., "Copper Complexes fo Co(II), Ni(II), Cu(II), UO2(II), Fe(III), Y(III) and La(III) with Schiff bases derived from 2-furancarboxaldehyde and hyrdroxyanilines." ASW. Sc. Tec. Bull., 1996, vol. 17, p. 2-11.

* cited by examiner

Primary Examiner — Rip A. Lee

(57) ABSTRACT

The present invention relates to new tridentate ligand compounds with imino furan units, to a method for manufacturing said compounds and to their use in the preparation of catalysts for the homopolymerization or copolymerization of ethylene and alpha-olefins.

13 Claims, 1 Drawing Sheet

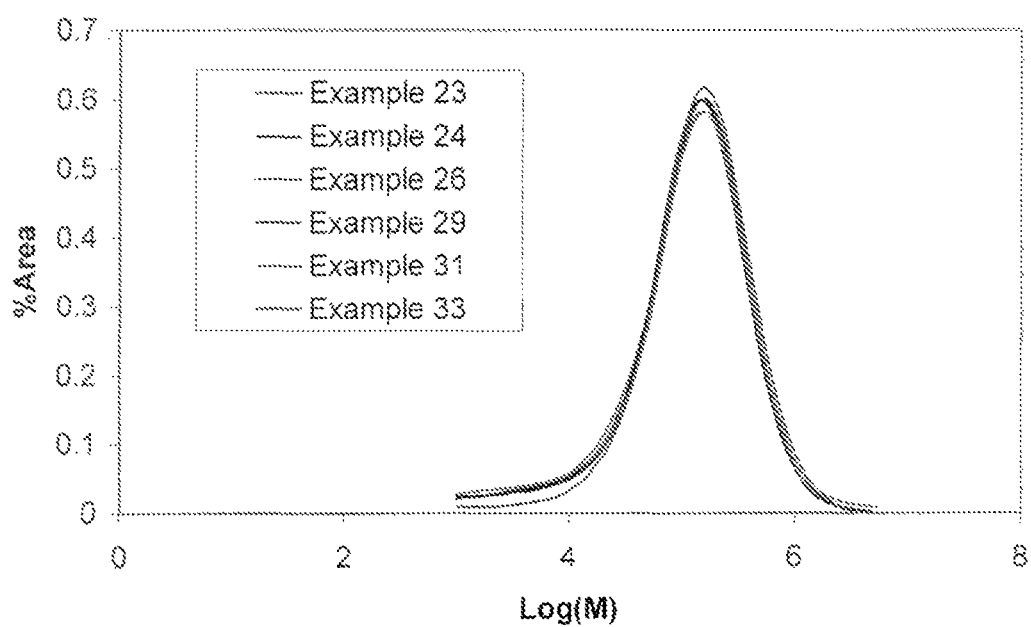

TRIDENTATE LIGAND COMPOUNDS WITH IMINO FURAN UNITS, METHOD FOR MANUFACTURING SAID COMPOUNDS, AND THEIR USE IN THE PREPARATION OF CATALYSTS FOR THE HOMOPOLYMERISATION AND COPOLYMERISATION OF ETHYLENE AND ALPHA-OLEFINS

CROSS-REFERENCE TO RELATED APPLICATIONS

This application claims the benefit of PCT/EP2008/056692, tiled May 30, 2008, which claims priority from EP 07110304.8, filed Jun. 14, 2007.

The present invention relates to new tridentate ligand compounds with imino furan units, to a method for manufacturing said compounds and to their use in the preparation of catalysts for the homopolymerisation and copolymerisation of ethylene and alpha-olefins.

More precisely, the present invention relates to the use of such new ligand compounds for preparing metallic complexes useful as catalysts for the homopolymerisation and copolymerisation of ethylene and α-olefins, to the catalytic systems including such metallic complexes and to a method for homopolymerising or copolymerising ethylene and α-olefins using such catalytic systems.

Different neutral bidentate ligands with imino furan units are mentioned:

In U.S. Pat. No. 5,714,556 (ligand 78, column 36):

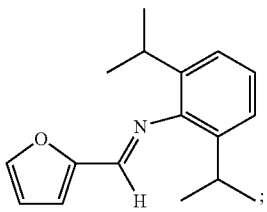 [SMILES: CC(C)c1cccc(C(C)C)c1/N=C/c1ccco1]

and in WO 00/50470 (ligand a18, p 28) or corresponding U.S. Pat. No. 6,545,108 B1

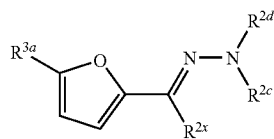

wherein $R^{3a}$, $R^{2d}$, $R^{2c}$ and $R^{2x}$ have different meanings.

The Applicant searched for other ligands in order to produce new catalysts for the polymerisation of ethylene and of α-olefins, and discovered the new tridentate anionic ligands with imino furane units, which are the subject-matter of the present invention. The homopolymers of ethylene obtained with such new catalysts are linear and have a monomodal distribution of polydispersity of 3 to 9 with very small tail ends.

A first subject-matter of the present invention relates to a compound of formula (I):

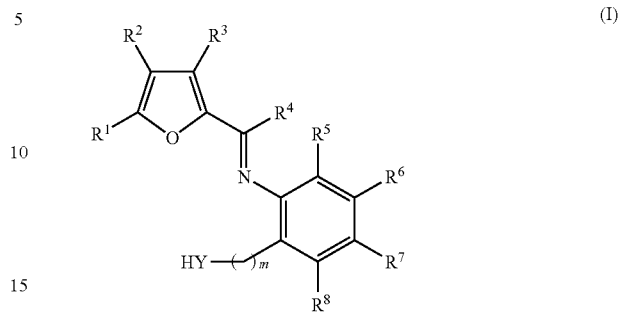

wherein:
- $R^1$ to $R^8$ each represent independently hydrogen, halogen, a substituted or unsubstituted $C_1$-$C_{20}$ hydrocarbyl group, an inert functional group, wherein each of the radicals $R^1$ to $R^8$ can be linked to a neighbouring radical in order to form a cycle with carbon atoms to which said radicals are attached;
- Y represents O or NR*, R* being a $C_1$-$C_{12}$ alkyl group or a $C_6$-$C_{12}$ aryl group;
- m is 0, 1 or 2.

The hydrocarbyl groups encompass methyl, tert-butyl and phenyl groups. The hydrocarbyl groups can include a heteroatom such as oxygen or nitrogen atoms in their chains.

The possible substituents of hydrocarbyl groups can be selected among $CF_3$, $NO_2$, OMe and halogen such as Cl.

The inert functional groups can be selected among $CF_2$, $NO_2$, OMe and halogen.

$R^1$ to $R^3$ are each preferably selected independently from the group consisting of hydrogen and aryl groups. Aryl groups can be selected among phenyl, naphthyl, and substituted phenyl groups.

$R^4$ is preferably selected in the group consisting of hydrogen and methyl group.

$R^5$ to $R^8$ are preferably independently selected in the group consisting of hydrogen, alkyl, aryl, methoxy, halogen, nitro and cyano.

Y is preferably O. m is preferably 0 or 1.

Specific compounds of formula (I) are the following ones:
2-{[5-(2-(trifluoromethyl)phenyl)furan-2-yl]methyleneamino}phenol
4-methyl-2-{[5-(2-(trifluoromethyl)phenyl)furan-2-yl]methyleneamino}phenol
4-tert-butyl-2-{[5-(2-(trifluoromethyl)phenyl)furan-2-yl]methyleneamino}phenol
3-{[5-(2-(trifluoromethyl)phenyl)furan-2-yl]methyleneamino}biphenyl-4-ol
4-chloro-2-{[5-(2-(trifluoromethyl)phenyl)furan-2-yl]methyleneamino}phenol
2-{[5-(3-(trifluoromethyl)phenyl)furan-2-yl]methyleneamino}phenol
4-nitro-2-{[5-(4-nitrophenyl)furan-2-yl]methyleneamino}phenol
2-{[5-(4-nitrophenyl)furan-2-yl]methyleneamino}phenol
2-{[5-(3-nitrophenyl)furan-2-yl]methyleneamino}phenol
2-{[5-(3-chlorophenyl)furan-2-yl)]methyleneamino}phenol
2-{[5-(2-chlorophenyl)furan-2-yl]methyleneamino}phenol
2-{[5-(4-chlorophenyl)furan-2-yl]methyleneamino}phenol Another subject-matter of the present invention relates to a method for manufacturing a compound of formula (I) as defined above, characterised in that a compound of formula (II):

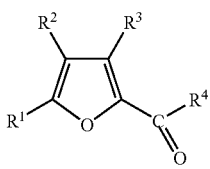

(II)

wherein $R^1$ to $R^4$ are as defined above
is reacted with a compound of formula (III):

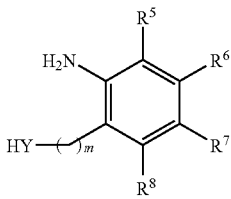

(III)

wherein m is 0, 1 or 2 and $R^5$ to $R^8$ are as defined above.

The general conditions of such a reaction are as follows:

Reacting compound (III) with compound (II) in an alcohol such as methanol or ethanol, in the presence of a catalytic amount of a protic acid such as acetic acid, at room temperature.

Removing the solvent by evaporation under reduced pressure to recover compound (I).

Recrystallising or washing the product in an alcane such as pentane or hexane.

A further subject-matter of the present invention relates to the use of a compound as defined above or prepared by the method as defined above as a ligand of a metallic complex.

A further subject-matter of the present invention relates to a metallic complex of the formula (IV):

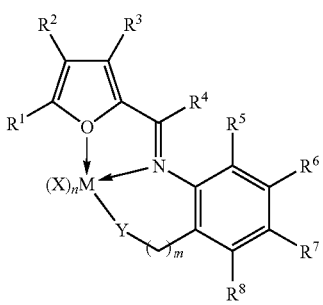

(IV)

wherein:
R$^1$ to R$^8$, Y and m are as defined above;
M is a metal belonging to groups 3 to 8 of the Periodic Classification;
X represents an halogen, a substituted or unsubstituted $C_1$-$C_{20}$ hydrocarbyl group, an amino group, an aryloxy group or an alkoxy group; and
n is a numeral value determined by the oxidation state of the metal minus one.

The preferred definitions for $R^1$ to $R^8$, Y and m are as mentioned above for the compound of formula (I).

M is preferably selected from the metals belonging to groups 3 to 8 of the Periodic Classification, being in particular Ti, Cr, Fe, Zr, Hf, V, Mn, a rare-earth metal, being preferably Ti, Cr, Fe and Zr.

X preferably represents halogen, alkyl such as benzyl, amino such as dimethylamino, alkoxy such as isopropoxy, aryloxy such as phenoxy, preferably halogen such as chlorine.

A further subject-matter of the present invention relates to a method for manufacturing a metallic complex as defined above, wherein a metallic compound of formula (V):

$$MX_{n+1} \quad (V)$$

wherein M, X and n are as defined above
is reacted with a ligand of the formula (I) as defined above.

The general conditions of such a reaction are as follows:
Optionally reacting compound (I) with an equimolar amount of a deprotonating agent such as sodium hydride or butyl lithium, in tetrahydrofuran or diethyl ether at low temperature, under inert atmosphere.

Adding the resulting mixture or a solution of compound (I) in tetrahydrofuran or diethyl ether to compound (V) and stirring at room temperature.

Removing the solvent by evaporation under reduced pressure.

Optionally dissolving the residue in an other solvent such as toluene or dichloromethane, filtering this solution to eliminate the sodium or the lithium salt and evaporating the filtrate to recover compound (IV).

A further subject-matter of the present invention relates to the use of the metallic complex as defined above or prepared by the process as defined above as a catalyst in the homopolymerisation and the copolymerisation of ethylene and α-olefins.

Exemplary α-olefins are the ones having from 3 to 8 carbon atoms, preferably propylene.

A further subject-matter of the present invention relates to a catalytic system comprising:
the metallic complex as defined above;
an activating agent selected in particular from the aluminum alkyls, the aluminoxanes and the boron-based activators; and
optionally, a carrier of the said metallic complex.

The aluminum alkyls are represented by the formula $AlR_x$, wherein R are all identical or different, and are selected from halides or from alkoxy or alkyl groups having from 1 to 12 carbon atoms and x is from 1 to 3. Especially suitable aluminum alkyls are dialkylaluminum chloride, the most preferred being diethylaluminum chloride ($Et_2AlCl$).

The preferred aluminoxanes comprise oligomeric linear and/or cyclic alkyl aluminoxanes represented by the formula:

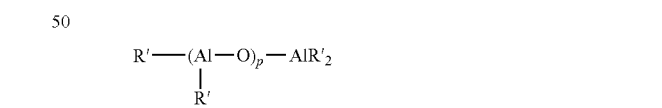

for oligomeric, linear aluminoxanes, and

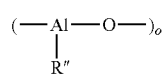

for oligomeric, cyclic aluminoxanes,
wherein:
p is 1-40, preferably 10-20;
o is 3-40, preferably 3-20; and
R' or R" is a $C_1$-$C_8$ alkyl group, being preferably methyl.
Methylaluminoxane is preferably used.

Suitable boron-based activating agents that can be used comprise a triphenyl carbenium boronate such as tetrakis-pentafluorophenyl-borato-triphenylcarbenium $[C(Ph_3)^+B(C_6H_5)^-_4]$ as described in EP-A-0,427,696, or those of the general formula $[L-H']+[BAr_1Ar_2X_3X_4]$— as described in EP-A-0 277 004 (page 6, line 30 to page 7, line 7).

The support, if present, can be a porous mineral oxide. It is advantageously selected from silica, alumina and mixtures thereof. Preferably, it is silica.

The activating agent is preferably an alkyl aluminum or an aluminoxane, the molar ratio Al/M being approximately 500 to 2000, preferably about 1000.

Still a further subject-matter of the present invention relates to a method for homopolymerising or copolymerising ethylene and α-olefins, comprising the steps of:
(a) injecting into the reactor the catalytic system as defined above, a solvent and optionally a scavenger;
(b) injecting the monomer and optional comonomer(s) into the reactor either before or after or simultaneously with step (a);
(c) maintaining under polymerisation conditions;
(d) optionally adding an acidic solution of an alcohol to precipitate and filtrate the polymer;
(e) retrieving the polymer under the form of a powder.

The scavenger may be selected from aluminium alkyls or diethyl zinc.

The monomers that can be used in the present invention are selected among ethylene and α-olefins having from 3 to 8 carbon atoms, being preferably ethylene and propylene.

The conditions of temperature and pressure for the polymerisation process are not particularly limited.

The pressure in the reactor can vary from 0.5 to 50 bars, preferably from 15 to 29 bars.

The polymerisation temperature can range from 10 to 100° C., preferably from 40 to 90° C.

The solvent is typically selected from alcanes or toluene, being preferably toluene, heptane or isobutane.

The reaction is usually carried out for a period of time of from 15 minutes to 24 hours.

The polymer obtained according to the present invention is typically obtained as a powder. The homopolyethylene that can be obtained have a Mn of 25 to 75 kDa, preferably of 30-60 kDa, a Mw of 150-400 kDa, preferably of 175-350 kDa, and a Mw/Mn of about 3 to 9.

The following Examples are intended to illustrate the present invention without limiting its scope.

In these Examples, the following abbreviation have been used:
MAO: Methylaluminoxane
Me: Methyl
Ph: Phenyl
tBu: tert-Butyl
TiBAl: Triisobutylaluminium EXAMPLES 1 to 12

Synthesis of Furan-Iminophenol Ligands

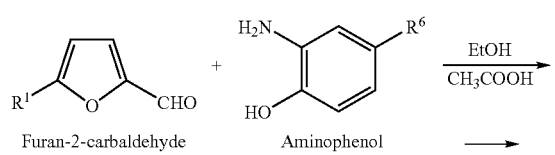

Furan-2-carbaldehyde    Aminophenol

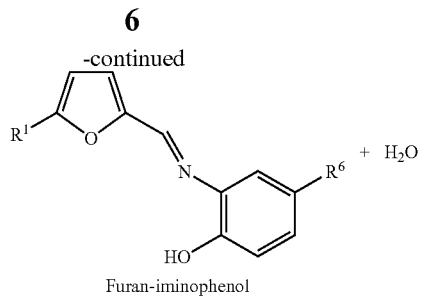

Furan-iminophenol

General Procedure

The aminophenol (12 mmol) was added to a solution of furan-2-carbaldehyde (12 mmol) and acid acetic (0.4 ml) in ethanol (30 ml). The mixture was stirred at room temperature for 18 hours. Then the solvent was removed by evaporation under reduced pressure at 50° C.

The residue was recrystallised in pentane at a temperature of −20° C. (Examples 1 to 6). Alternatively, the residue was stirred with 250 ml of pentane, filtered and dried under vacuum (Examples 7 to 12).

EXAMPLE 1

Preparation of 2-{[5-(2-(trifluoromethyl)phenyl)furan-2-yl]methyleneamino}phenol ($R^1$=2-$CF_3$—$C_6H_4$; $R^6$=H)

Using 2-Aminophenol and 5-(2-(trifluoromethyl)phenyl)furan-2-carbaldehyde, 3.53 g of 2-{[5-(2-(trifluoromethyl)phenyl)furan-2-yl]methyleneamino}phenol were obtained as a yellow powder (yield 89%).

RMN$^1$ H (CD$_2$Cl$_2$, 500 MHz): ppm 8.57 (s, 1H, HC=N), 7.92 (d, 1H, CF$_3$—C$_6$H$_4$), 7.86 (d, 1H, CF$_3$—C$_6$H$_4$), 7.69 (t, 1H, CF$_3$—C$_6$H$_4$), 7.57 (t, 1H, CF$_3$—C$_6$H$_4$), 7.50 (s, 1H, OH), 7.35 (dd, 1H, C$_6$H$_4$OH), 7.23 (td, 1H, C$_6$H$_4$OH), 7.18 (d, 1H, C$_4$H$_2$O), 7.02 (dd, 1H, C$_6$H$_4$OH), 6.95 (td, 1H, C$_6$H$_4$OH), 6.94 (d, 1H, C$_4$H$_2$O).

EXAMPLE 2

Preparation of 4-methyl-2-{[5-(2-(trifluoromethyl)phenyl)furan-2-yl]methyleneamino}phenol ($R^1$=2-$CF_3$—$C_6H_4$; $R^6$=Me)

Using 2-amino-4-methylphenol and 5-(2-(trifluoromethyl)phenyl)furan-2-carbaldehyde, 3.82 g of 4-methyl-2-{[5-(2-(trifluoromethyl)phenyl)furan-2-yl]methyleneamino}phenol were obtained as a yellow powder (yield 92%).

RMN $^1$H (CD$_2$Cl$_2$, 500 MHz): ppm 8.53 (s, 1H, HC=N), 7.90 (d, 1H, CF$_3$—C$_6$H$_4$), 7.85 (d, 1H, CF$_3$—C$_6$H$_4$), 7.68 (t, 1H, CF$_3$—C$_6$H$_4$), 7.56 (t, 1H, CF$_3$—C$_6$H$_4$), 7.36 (s, 1H, OH), 7.15 (m, 2H, C$_6$H$_3$OH and C$_4$H$_2$O), 7.05 (dq, 1H, C$_6$H$_3$OH), 6.92 (m, 2H, C$_6$H$_3$OH and C$_4$H$_2$O), 2.35 (s, 3H, CH$_3$).

EXAMPLE 3

Preparation of 4-tert-butyl-2-{[5-(2-(trifluoromethyl)phenyl)furan-2-yl]methyleneamino}phenol ($R^1$=2-$CF_3$—$C_6H_4$; $R^6$=tbu)

Using 2-amino-4-tert-butylphenol and 5-(2-(trifluoromethyl)phenyl)furan-2-carbaldehyde, 4.25 g of 4-tert-butyl-2-{[5-(2-(trifluoromethyl)phenyl)furan-2-yl]methyleneamino}phenol were obtained as a yellow powder (yield 91%).

RMN $^1$H (CD$_2$Cl$_2$, 500 MHz): ppm 8.57 (s, 1H, HC=N), 7.91 (d, 1H, CF$_3$—C$_6$H$_4$), 7.85 (d, 1H, CF$_3$—C$_6$H$_4$), 7.67 (t, 1H, CF$_3$—C$_6$H$_4$), 7.56 (t, 1H, CF$_3$—C$_6$H$_4$), 7.39 (s, 1H, OH), 7.35 (d, 1H, C$_6$H$_3$OH), 7.28 (dd, 1H, C$_6$H$_3$OH), 7.16 (d, 1H, C$_4$H$_2$O), 6.94 (m, 2H, C$_6$H$_3$OH and C$_4$H$_2$O), 1.37 (s, 9H, tBu).

EXAMPLE 4

Preparation of 3-{[5-(2-(trifluoromethyl)phenyl)furan-2-yl]methyleneamino}biphenyl-4-ol (R$^1$=2-CF$_3$—C$_6$H$_4$; R$^6$=Ph)

Using 3-aminobiphenyl-4-ol and 5-(2-(trifluoromethyl)phenyl)furan-2-carbaldehyde, 1.64 g of 3-{[5-(2-(trifluoromethyl)phenyl)furan-2-yl]methyleneamino}biphenyl-4-ol was obtained as an orange powder (yield 34%).

RMN $^1$H (CD$_2$Cl$_2$, 500 MHz): ppm 8.62 (s, 1H, HC=N), 7.91 (d, 1H, CF$_3$—C$_6$H$_4$), 7.85 (d, 1H, CF$_3$—C$_6$H$_4$), 7.67 (t, 1H, CF$_3$—C$_6$H$_4$), 7.63 (m, 3H, Ph), 7.56 (m, 2H, OH and CF$_3$—C$_6$H$_4$), 7, 49 (m, 3H, C$_6$H$_3$OH and Ph), 7.37 (tt, 1H, C$_6$H$_3$OH), 7.19 (d, 1H, C$_4$H$_2$O), 7.11 (d, 1H, C$_6$H$_3$OH), 6.95 (d, 1H, C$_4$H$_2$O).

EXAMPLE 5

Preparation of 4-chloro-2-{[5-(2-(trifluoromethyl)phenyl)furan-2-yl]methyleneamino}phenol (R$^1$=2-CF$_3$—C$_6$H$_4$; R$^6$=Cl)

Using 2-amino-4-chlorophenol and 5-(2-(trifluoromethyl)phenyl)furan-2-carbaldehyde, 3.76 g of 4-chloro-2-{[5-(2-(trifluoromethyl)phenyl)furan-2-yl]methyleneamino}phenol were obtained as a yellow powder (yield 86%).

RMN $^1$H (CD$_2$Cl$_2$, 500 MHz): ppm 8.52 (s, 1H, HC=N), 7.91 (d, 1H, CF$_3$—C$_6$H$_4$), 7.86 (d, 1H, CF$_3$—C$_6$H$_4$), 7.71 (t, 1H, CF$_3$—C$_6$H$_4$), 7.59 (t, 1H, CF$_3$—C$_6$H$_4$), 7.38 (s, 1H, OH), 7.34 (d, 1H, C$_6$H$_3$OH), 7.22 (d, 1H, C$_4$H$_2$O), 7.19 (dd, 1H, C$_6$H$_3$OH), 6.97 (d, 1H, C$_6$H$_3$OH), 6.95 (d, 1H, C$_4$H$_2$O).

EXAMPLE 6

Preparation of 2-{[5-(3-(trifluoromethyl)phenyl)furan-2-yl]methyleneamino}phenol (R$^1$=3-CF$_3$—C$_6$H$_4$; R$^6$=H)

Using 2-Aminophenol and 5-(3-(trifluoromethyl)phenyl)furan-2-carbaldehyde, 3.44 g of 2-{[5-(3-(trifluoromethyl)phenyl)furan-2-yl]methyleneamino}phenol were obtained as a yellow powder (yield 86%).

RMN $^1$H (CD$_2$Cl$_2$, 500 MHz): ppm 8.59 (s, 1H, HC=N), 8.10 (m, 1H, CF$_2$—C$_6$H$_4$), 8.05 (dm, 1H, CF$_3$—C$_6$H$_4$), 7.64 (m, 2H, CF$_2$—C$_6$H$_4$), 7.44 (s, 1H, OH), 7.36 (dd, 1H, C$_6$H$_4$OH), 7.24 (ddd, 1H, C$_6$H$_4$OH), 7.20 (d, 1H, C$_4$H$_2$O), 7.03 (dd, 1H, C$_6$H$_4$OH), 7.01 (d, 1H, C$_4$H$_2$O), 6.96 (ddd, 1H, C$_6$H$_4$OH).

EXAMPLE 7

Preparation of 4-nitro-2-{[5-(4-nitrophenyl)furan-2-yl]methyleneamino}phenol (R$^1$=4-NO$_2$—C$_6$H$_4$; R$^6$=NO$_2$)

Using 2-amino-4-nitrophenol and 5-(4-nitrophenyl)furan-2-carbaldehyde, 4.10 g of 4-nitro-2-{[5-(4-nitrophenyl)furan-2-yl]methyleneamino}phenol were obtained as a yellow powder (yield 97%).

RMN $^1$H (CD$_2$Cl$_2$, 500 MHz): ppm 8.72 (s, 1H, HC=N), 8.36 (m, 2H, NO$_2$—C$_6$H$_4$), 8.31 (d, 1H, C$_6$H$_3$OH), 8.2 (dd, 1H, C$_6$H$_3$OH), 8.04 (m, 2H, NO$_2$—C$_6$H$_4$), 7.34 (d, 1H, C$_6$H$_3$OH), 7.16 (m, 2H, C$_4$H$_2$O).

EXAMPLE 8

Preparation of 2-{[5-(4-nitrophenyl)furan-2-yl]methyleneamino}phenol (R$^1$=4-NO$_2$—C$_6$H$_4$; R$^6$=H)

Using 2-aminophenol and 5-(4-nitrophenyl)furan-2-carbaldehyde, 3.62 g of 2-{[5-(4-nitrophenyl)furan-2-yl]methyleneamino}phenol were obtained as a yellow powder (yield 98%).

RMN $^1$H (CD$_2$Cl$_2$, 500 MHz): ppm 8.59 (s, 1H, HC=N), 8.33 (m, 2H, NO$_2$—C$_6$H$_4$), 7.99 (m, 2H, NO$_2$—C$_6$H$_4$), 7.49 (s, 1H, OH), 7.37 (dd, 1H, C$_6$H$_4$OH), 7.25 (td, 1H, C$_6$H$_4$OH), 7.21 (d, 1H, C$_4$H$_2$O), 7.12 (d, 1H, C$_4$H$_2$O), 7.04 (dd, 1H, C$_6$H$_4$OH), 6.97 (td, 1H, C$_6$H$_4$OH).

EXAMPLE 9

Preparation of 2-{[5-(3-nitrophenyl)furan-2-yl]methyleneamino}phenol (R$^1$=3-NO$_2$—C$_6$H$_4$; R$^6$=H)

Using 2-aminophenol and 5-(3-nitrophenyl)furan-2-carbaldehyde, 3.51 g of 2-{[5-(3-nitrophenyl)furan-2-yl]methyleneamino}phenol were obtained as a yellow powder (yield 95%).

RMN $^1$H (CD$_2$Cl$_2$, 500 MHz): ppm 8.62 (t, 1H, NO$_2$—C$_6$H$_4$), 8.55 (s, 1H, HC=N), 8.24 (dm, 1H, NO$_2$—C$_6$H$_4$), 8.13 (dm, 1H, NO$_2$—C$_6$H$_4$), 7.65 (t, 1H, NO$_2$—C$_6$H$_4$), 7.34 (dd, 1H, C$_6$H$_4$OH), 7.24 (td, 1H, C$_6$H$_4$OH), 7.18 (d, 1H, C$_4$H$_2$O), 7.05 (d, 1H, C$_4$H$_2$), 7.04 (dd, 1H, C$_6$H$_4$OH), 6.96 (td, 1H, C$_6$H$_4$OH).

EXAMPLE 10

Preparation of 2-{[5-(3-chlorophenyl)furan-2-yl)]methyleneamino}phenol (R$^1$=3-Cl—C$_6$H$_4$; R$^6$=H)

Using 2-aminophenol and 5-(3-chlorophenyl)furan-2-carbaldehyde, 2.94 g of 2-{[5-(3-chlorophenyl)furan-2-yl]methyleneamino}phenol were obtained as a yellow powder (yield 82%).

RMN $^1$H (CD$_2$Cl$_2$, 500 MHz): ppm 8.43 (s, 1H, HC=N), 7.9 (s, 1H, OH), 7.78 (m, 1H, Cl—C$_6$H$_4$), 7.64 (dt, 1H, Cl—C$_6$H$_4$), 7.35 (m, 2H, Cl—C$_6$H$_4$ and C$_6$H$_4$OH), 7.27 (m, 2H, Cl—C$_6$H$_4$ and C$_6$H$_4$OH), 7.06 (m, 2H, C$_6$H$_4$OH and C$_4$H$_2$O), 6.95 (td, 1H, C$_6$H$_4$OH), 6.88 (d, 1H, C$_4$H$_2$O).

EXAMPLE 11

Preparation of 2-{[5-(2-chlorophenyl)furan-2-yl]methyleneamino}phenol ($R^1$=2-Cl—$C_6H_4$; $R^6$=H)

Using 2-aminophenol and 5-(2-chlorophenyl)furan-2-carbaldehyde, 2.69 g of 2-{[5-(2-chlorophenyl)furan-2-yl]methyleneamino}phenol were obtained as a yellow powder (yield 75%).

RMN $^1$H (CD$_2$Cl$_2$, 500 MHz): ppm 8.59 (s, 1H, HC=N), 8.08 (dd, 1H, Cl—$C_6H_4$), 7.54 (dd, 1H, Cl—$C_6H_4$), 7.44 (td, 2H, Cl—$C_6H_4$ and OH), 7.36 (m, 3H, Cl—$C_6H_4$ and $C_6H_4$OH and $C_4H_2$O), 7.23 (td, 1H, $C_6H_4$OH), 7.21 (d, 1H, $C_4H_2$O), 7.02 (dd, 1H, $C_6H_4$OH), 6.96 (td, 1H, $C_6H_4$OH).

EXAMPLE 12

Preparation of 2-{[5-(4-chlorophenyl)furan-2-yl]methyleneamino}phenol ($R^1$=4-Cl—$C_6H_4$, $R^6$=H)

Using 2-aminophenol and 5-(4-chlorophenyl)furan-2-carbaldehyde, 3.18 g of 2-{[5-(4-chlorophenyl)furan-2-yl]methyleneamino}phenol were obtained as a yellow powder (yield 89%).

RMN $^1$H (CD$_2$Cl$_2$, 500 MHz): ppm 8.55 (s, 1H, HC=N), 7.81 (dm, 2H, Cl—$C_6H_4$), 7.47 (dm, 2H, Cl—$C_6H_4$), 7.35 (dd, 1H, $C_6H_4$OH), 7.23 (td, 1H, $C_6H_4$OH), 7.22 (d, 1H, $C_4H_2$O), 7.03 (dd, 1H, $C_6H_4$OH), 6.96 (dt, 1H, $C_6H_4$OH), 6.92 (d, 1H, $C_4H_2$O).

EXAMPLE 13

Preparation of 4-chloro-2-{[5-(4-chlorophenyl)furan-2-yl]methyleneamino}phenol ($R^1$=4-Cl—$C_6H_4$, $R^6$=H)

Using 2-amino-4-chlorophenol and 5-(4-chlorophenyl)furan-2-carbaldehyde, 3.18 g of 4-chloro-2-{[5-(4-chlorophenyl)furan-2-yl]methyleneamino}phenol were obtained as a yellow powder (yield 95%).

RMN $^1$H (CD$_2$Cl$_2$, 500 MHz): ppm 8.45 (s, 1H, HC=N), 7.76 (dm, 2H, Cl—$C_6H_4$), 7.44 (dm, 2H, Cl—$C_6H_4$), 7.38 (bs, 1H, OH), 7.29 (d, 1H, $C_6H_3$OH), 7.16 (m, 2H, $C_6H_3$OH), 6.95 (d, 1H, $C_4H_2$O), 6.89 (d, 1H, $C_4H_2$O).

EXAMPLES 14 to 25

Synthesis of Furan-Iminophenoxyzirconium Trichloride Complexes

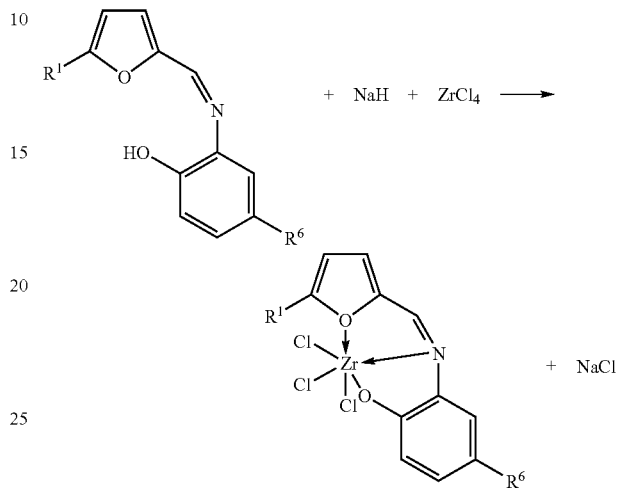

General Procedure

The synthesis was done under inert atmosphere with dried solvents. Sodium hydride (2.5 mmol, 0.06 g) was added to a solution of a ligand (2.5 mmol as prepared in Examples 1 to 12, respectively) in THF (15 ml) at −20° C. After 2 hours, this red solution was added dropwise to ZrCl$_4$ (2.5 mmol, 0.583 g) and the mixture was stirred overnight at room temperature. Then the solvent was removed by evaporation under reduced pressure and the residue was dissolved in 30 ml of dichloromethane. The solution was filtered through a pad of celite and the filtrate was dried under vacuum. The residue was washed with pentane and dried under vacuum to result in a final product under the form of a red or orange powder.

In Table 1 thereafter are listed the complexes obtained thereby as well as for each of them the amount obtained and the yield.

The yield is defined as follows:

mass of complex obtained/mass of complex expected for 2.5 mmol

TABLE 1

| Example | Ligand of Example | Complex | Mass (g) | Yield (%) |
|---|---|---|---|---|
| 14 | 1 | 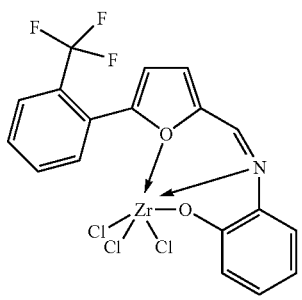 | 1.31 | 99 |

TABLE 1-continued

| Example | Ligand of Example | Complex | Mass (g) | Yield (%) |
|---|---|---|---|---|
| 15 | 2 | (structure) | 1.34 | 99 |
| 16 | 3 | (structure) | 1.38 | 95 |
| 17 | 4 | (structure) | 1.50 | 99 |
| 18 | 5 | (structure) | 1.12 | 80 |

TABLE 1-continued
| Example | Ligand of Example | Complex | Mass (g) | Yield (%) |
|---|---|---|---|---|
| 19 | 6 | 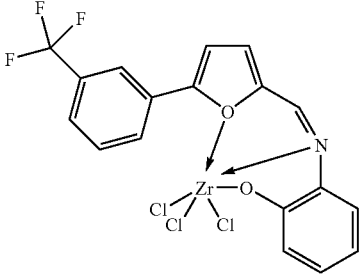 | 1.16 | 88 |
| 20 | 7 | 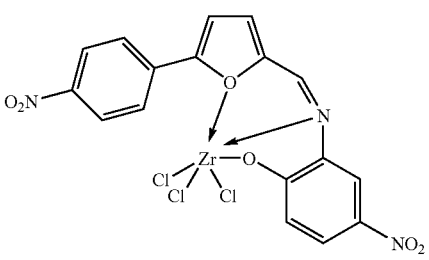 | 1.34 | 97 |
| 21 | 8 | 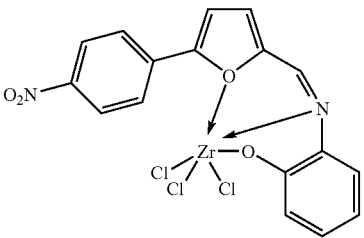 | 1.29 | 100 |
| 22 | 9 | 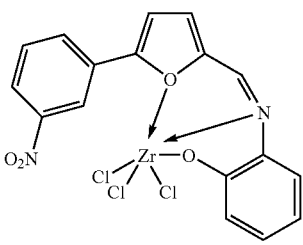 | 1.29 | 100 |
| 23 | 10 | 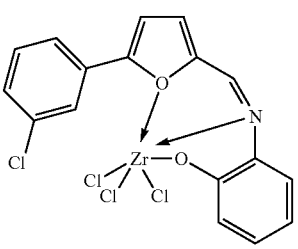 | 1.44 | 100 |
| 24 | 11 | 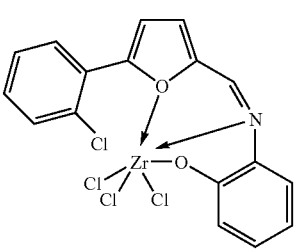 | 1.41 | 100 |

TABLE 1-continued

| Example | Ligand of Example | Complex | Mass (g) | Yield (%) |
|---|---|---|---|---|
| 25 | 12 | 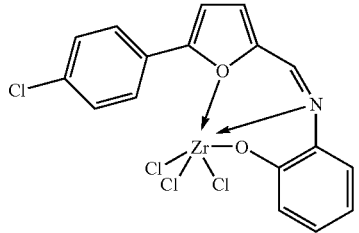 | 1.42 | 100 |

EXAMPLES 26 to 31

Synthesis of Furan-Iminophenoxytitanium Trichloride Complexes

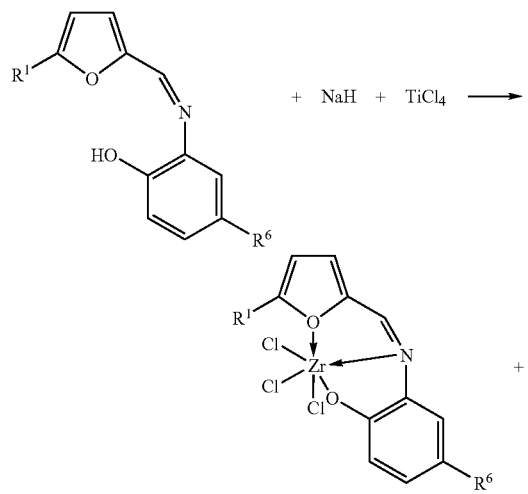

General Procedure

The synthesis was done under inert atmosphere with dried solvents. Sodium hydride (2.5 mmol, 0.06 g) was added to a solution of a ligand (2.5 mmol as prepared in Examples 1 to 13) in THF (15 ml) at −20° C. Then, $TiCl_4$ (2.5 mmol, 0.110 ml) was added dropwise to this red solution and the mixture was stirred overnight at room temperature. Then the solvent was removed by evaporation under reduced pressure and the residue was dissolved in 70 ml of dichloromethane. The solution was filtered through a pad of celite and the filtrate was dried under vacuum. The residue was washed with pentane and dried under vacuum to result in a final product under the form of a red or orange powder.

In Table 2 thereafter are listed the complexes obtained thereby as well as for each of them the amount obtained and the yield.

The yield is defined as follows:

mass of complex obtained/mass of complex expected for 2.5 mmol

TABLE 2

| Example | Ligand of Example | Complex | Mass (g) | Yield (%) |
|---|---|---|---|---|
| 26 | 1 | 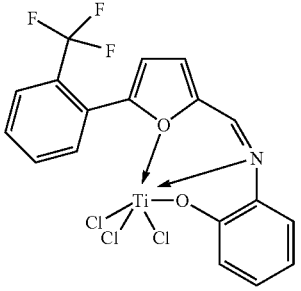 | 0.74 | 45 |

TABLE 2-continued

| Example | Ligand of Example | Complex | Mass (g) | Yield (%) |
|---|---|---|---|---|
| 27 | 3 | | 0.61 | 61 |
| 28 | 5 | | 0.86 | 66 |
| 29 | 11 | | 0.58 | 52 |
| 30 | 12 | | 0.55 | 49 |
| 31 | 13 | | 0.09 | 14 |

EXAMPLES 32 to 56

Polymerisation of Ethylene

General Procedure

Polymerisation reactions were realised on a 24 parallel reactor unit containing 50 ml glass inserts with magnetic stirrers. In a glove box, 1 mg of complex (as prepared in Examples 14 to 31) was introduced into a vial. Then, 0.8 ml of MAO (30 wt % in toluene) and 24 ml of toluene were added. The vials were crimped with a septum and installed into the reactor unit heated at 60° C. The septa of the vials were pierced by the needles of the reactor unit. The stirring was started and regulated at 1000 rpm. Ethylene was then injected and the pressure was regulated at 22 bar, while the temperature was increased to 80° C. These conditions were maintained during 30 min., then the reactors were depressurised and cooled down. The vials were opened and an acidic alcoholic solution was added. The polymers were filtered, washed and dried. GPC curves are illustrated in FIG. 1.
Results are summarised as follows:

TABLE 3

| Example | Complex of Example | Mass of complex (mg) | μmol of Complex | Mass of PE (g) | Activity* (g/g/h) | Activity* kg/mmol/h | Tm** (° C.) |
|---|---|---|---|---|---|---|---|
| 32 | 14 | 1.18 | 2.23 | 0.79 | 1344 | 0.71 | n.d. |
| 33 | 14 | 1.12 | 2.13 | 0.95 | 1692 | 0.89 | 132.8 |
| 34 | 15 | 1.20 | 2.22 | 0.91 | 1513 | 0.82 | 132.8 |
| 35 | 15 | 1.09 | 2.02 | 0.98 | 1792 | 0.97 | 132.8 |
| 36 | 16 | 1.04 | 1.78 | 0.99 | 1904 | 1.11 | 134.1 |
| 37 | 16 | 1.13 | 1.94 | 0.85 | 1499 | 0.88 | n.d. |
| 38 | 17 | 1.14 | 1.89 | 1.09 | 1512 | 1.15 | 132.8 |
| 39 | 17 | 1.28 | 2.12 | 1.03 | 1609 | 0.97 | n.d. |
| 40 | 18 | 1.04 | 1.84 | 0.90 | 1736 | 0.98 | n.d. |
| 41 | 18 | 1.08 | 1.93 | 1.32 | 2435 | 1.37 | 133.4 |
| 42 | 19 | 1.05 | 1.99 | 0.89 | 1695 | 0.89 | n.d. |
| 43 | 19 | 1.11 | 2.10 | 0.98 | 1769 | 0.93 | 134 |
| 44 | 20 | 1.08 | 1.96 | 0.91 | 1690 | 0.93 | n.d. |
| 45 | 20 | 1.20 | 2.18 | 0.85 | 1421 | 0.78 | 133.2 |
| 46 | 21 | 1.375 | 2.72 | 0.675 | 981.8 | 0.50 | n.d. |
| 47 | 22 | 1.067 | 2.11 | 0.833 | 1561 | 0.79 | n.d. |
| 48 | 23 | 0.955 | 1.93 | 1.124 | 2354 | 1.16 | n.d. |
| 49 | 24 | 0.993 | 2.01 | 1.05 | 2115 | 1.05 | n.d. |
| 50 | 25 | 1.029 | 2.08 | 1.293 | 2513 | 1.24 | n.d. |
| 51 | 26 | 0.5908 | 1.22 | 0.89 | 3013 | 1.46 | n.d. |
| 52 | 27 | 0.5575 | 1.03 | 0.88 | 3157 | 1.71 | n.d. |
| 53 | 28 | 0.539 | 1.04 | 0.92 | 3414 | 1.77 | n.d. |
| 54 | 29 | 0.4813 | 1.07 | 0.62 | 2576 | 1.16 | n.d. |
| 55 | 30 | 0.4725 | 1.05 | 1.01 | 4275 | 1.93 | n.d. |
| 56 | 31 | 0.5018 | 1.03 | 0.93 | 3707 | 1.80 | n.d. |

*Activity = Mass of PE (g)/Mass of complex (g)/0.5 h or Mass of PE (g)/μmol of complex/0.5 h
**Tm = measured by DSC method (Differential Scanning Calorimetry) at the second heating (Ramp of 50° C./min from −40° C. to 180° C.
n.d. = not determined

EXAMPLES 57 to 60

Preparation of Supported Catalysts

General Procedure

The support used was silica Sylopol® 952×1836 from Grace, modified with MAO to obtain a support with 60 wt % of MAO. The complex and the support were stirred in 50 ml of toluene at room temperature during 2 hours. Then the toluene was removed, the resulting catalyst was washed 3 times with pentane and dried under vacuum. The data are given in table 3.

TABLE 4

| Example | Complex of example | Mass of support (g) | Mass of complex (g) | Al* (%) | Zr* (%) |
|---|---|---|---|---|---|
| 57 | 16 | 5.003 | 0.113 | 13.85 | 0.26 |
| 58 | 17 | 5.262 | 0.116 | 13.45 | 0.28 |
| 59 | 18 | 5.154 | 0.119 | 13.5 | 0.29 |
| 60 | 19 | 5.057 | 0.12 | 13.60 | 0.35 |

*Elemental analysis measured by ICP-AES (Inductively Complet Plasma Atomic Emission Spectrometry)

EXAMPLES 61 to 68

Polymerisation of Ethylene with Supported Catalysts

General Procedure

Ethylene polymerisation reactions were carried out in a 130 ml stainless steel autoclave equipped with mechanical stirring and a stainless steel injection cylinder. In a typical reaction run, the reactor was first dried under nitrogen flow at 100° C. during 10 min. Then it was cooled down to the reaction temperature (85° C.) and 35 ml of isobutane were introduced into the reactor with a syringe pump, followed by the comonomer if required. The pressure was adjusted to the desired value (23.8 bar) with ethylene. In an argon-filled glove box, 100 mg of the supported catalyst of examples 57 to 60, the scavenger (0.3 ml of TiBAl 10 wt % in hexanes) and 0.4 ml of n-heptane were placed into the injection cylinder. The valve was closed and the cylinder was connected to the reactor under nitrogen flow. The active catalyst mixture was then introduced into the reactor with 40 ml of isobutane. After 1 hour, the reactor was cooled down to room temperature and slowly depressurised, and the polymer was recovered. The polymerisation results are displayed in table 4.

TABLE 5

| Example | Catalyst of example | Mass of catalyst (mg) | Mass of PE (g) | Activity* (g/g/h) |
|---|---|---|---|---|
| 61 | 57 | 99.7 | 1.30 | 13.04 |
| 62 | 57 | 99.9 | 1.48 | 14.81 |
| 63 | 58 | 100.1 | 1.50 | 14.99 |
| 64 | 58 | 100.4 | 1.16 | 11.56 |
| 65 | 59 | 101.1 | 1.89** | 18.69 |
| 66 | 59 | 100.0 | 1.79 | 17.91 |
| 67 | 60 | 99.7 | 0.90 | 9.03 |
| 68 | 60 | 99.9 | 0.98 | 9.81 |

*Activity is expressed as g polyethylene per g catalyst per hour.

The melting temperature Tm of example 42 was of 132.3° C. as measured by DSC.

The invention claimed is:

1. A metallic complex of formula (IV):

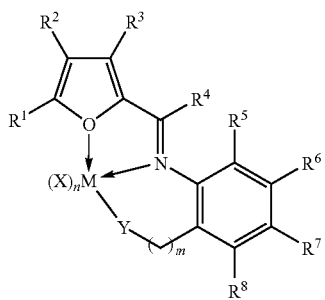

(IV)

wherein $R^1$ to $R^8$ are independently selected from H, halogens, substituted or unsubstituted $C_1$-$C_{20}$ hydrocarbyls or inert functional groups, each $R^1$ to $R^8$ can be linked to a neighbouring substituent in order to form a cycle with carbon atoms to which said radicals are attached; Y is selected from O or NR*, R* selected from $C_1$-$C_{12}$ alkyls or $C_6$-$C_{12}$ aryls; m is 0, 1 or 2 and is a metal belonging to the groups 4 to 7 of the Periodic Classification; X is selected from halogens, substituted or unsubstituted $C_1$-$C_{20}$ hydrocarbyl groups, amino groups, aryloxy groups and alkoxy groups; and n is a numeral value determined by the oxidation state of M minus one.

2. The metallic complex of claim 1, wherein $R^1$ to $R^3$ are each selected independently from H, halogens, alkyls or aryls having up to 12 carbon atoms.

3. The metallic complex of claim 1, wherein $R^4$ is selected from hydrogen or methyl.

4. The metallic complex of claim 1, wherein $R^5$ to $R^8$ are each independently selected from H, alkyls or aryls having up to 12 carbon atoms, halogen, methoxy, nitro or cyano.

5. The metallic complex of claim 1, wherein Y is O.

6. The metallic complex of claim 1, wherein M is selected from Ti, Cr, Zr, Hf or V.

7. The metallic complex of claim 1, wherein X is selected from halogens, aminos, alkyls, alkoxys or aryloxys having up to 12 carbon atoms.

8. A method for manufacturing a metallic complex of formula IV as defined in claim 1 comprising:

preparing a compound of formula I

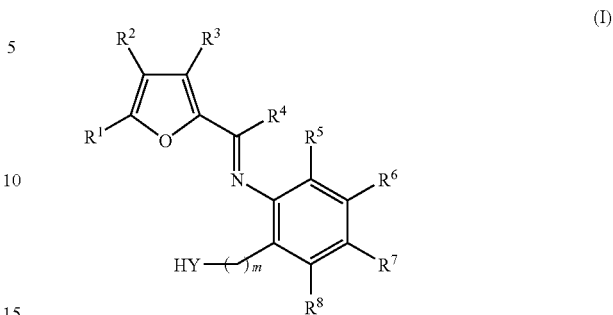

(I)

by reacting a compound of formula II

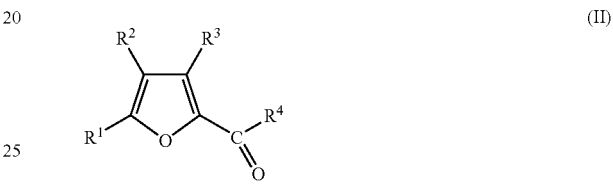

(II)

wherein $R^1$ to $R^4$ are as defined in claim 1 with a compound of formula III

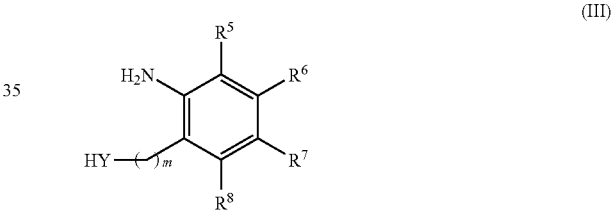

(III)

wherein m, Y, and $R^5$ to $R^8$ are as defined in claim 1; and reacting compound of formula I with a metallic compound of formula V $$MX_{n+1} \qquad (V)$$

wherein M, X and n are as defined in claim 1.

9. The method of claim 8, wherein the compound of formula I is selected from the group consisting of: 2-{[5-(2-(trifluoromethyl)phenyl)furan-2-yl]methyleneamino}phenol; 4-methyl-2-{[5-(2-(trifluoromethyl)phenyl)furan-2-yl]methyleneamino}phenol; 4-tert-butyl-2-{[5-(2-(trifluoromethyl)phenyl)furan-2-yl]methyleneamino}phenol; 3-{[5-(2-(trifluoromethyl)phenyl)furan-2-yl]methyleneamino}biphenyl-4-ol; 4-chloro-2-{[5-(2-(trifluoromethyl)phenyl)furan-2-yl]methyleneamino}phenol; 2-{[5-(3-(trifluoromethyl)phenyl)furan-2-yl]methyleneamino}phenol; 4-nitro-2-{[5-(4-nitrophenyl)furan-2-yl]methyleneamino}phenol; 2-{[5-(4-nitrophenyl)furan-2-yl]methyleneamino}phenol; 2-{[5-(3-nitrophenyl)furan-2-yl]methyleneamino}phenol; 2-{[5-(3-chlorophenyl)furan-2-yl]methyleneamino}phenol; 2-{[5-(2-chlorophenyl)furan-2-yl]methyleneamino}phenol and 2-{[5-(4-chlorophenyl)furan-2-yl]methyleneamino}phenol.

10. A catalytic system comprising the metallic complex as defined in claim 1; an activating agent selected from aluminium alkyls, aluminoxanes or boron-based activators; and a support of said metallic complex.

11. The catalytic system of claim 10, wherein the activating agent is aluminium alkyl or aluminoxane, and the catalytic system comprises a molar ratio Al/M of from about 500 to 2000.

12. A method for homopolymerising or copolymerising ethylene and α-olefins, comprising:
- injecting into a reactor the catalytic system as defined in claim 10 and a solvent and optionally a scavenger;
- injecting a monomer and optional comonomer(s) into the reactor, either before or after or simultaneously with the catalytic system;
- maintaining the reactor under polymerisation conditions to form a polymer;
- optionally adding an acidic solution of an alcohol to precipitate and filtrate the polymer; and
- retrieving the polymer in the form of a powder.

13. The method of claim 12, wherein the monomer is ethylene or propylene and the comonomer is propylene or 1-hexene.

* * * * *